United States Patent
Lin et al.

(10) Patent No.: US 7,292,972 B2
(45) Date of Patent: Nov. 6, 2007

(54) SYSTEM AND METHOD FOR COMBINING TEXT SUMMARIZATIONS

(75) Inventors: Xiaofan Lin, San Jose, CA (US); Igor M. Boyko, Montreal (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 896 days.

(21) Appl. No.: 10/354,379

(22) Filed: Jan. 30, 2003

(65) Prior Publication Data
US 2004/0153309 A1    Aug. 5, 2004

(51) Int. Cl.
*G06F 17/21* (2006.01)
(52) U.S. Cl. .............................. 704/9; 704/1; 715/530; 715/531
(58) Field of Classification Search ...................... None
See application file for complete search history.

(56) References Cited

U.S. PATENT DOCUMENTS

| | | | | |
|---|---|---|---|---|
| 5,778,397 | A * | 7/1998 | Kupiec et al. .............. | 715/500 |
| 6,581,057 | B1 * | 6/2003 | Witbrock et al. .............. | 707/5 |
| 6,990,634 | B2 * | 1/2006 | Conroy et al. .............. | 715/531 |
| 2003/0158843 | A1 * | 8/2003 | Boguraev et al. .............. | 707/5 |
| 2004/0122657 | A1 * | 6/2004 | Brants et al. .................. | 704/9 |
| 2005/0203970 | A1 * | 9/2005 | McKeown et al. ......... | 707/203 |

OTHER PUBLICATIONS

Aone et al. "Trainable, Scalable Summarization Using Robust NLP and Machine Learning" 1998, In Proc. of the 17th International Conference on Computational Linguistics and 35 Annual Meeting of the Association for Computational Linguistics, pp. 62-66.*
Kai Ishikawa et al—"Hybrid Text Summarization Method Based on the TF Method and the LEAD Method"—C&C Media Research NEC Corporation Japan—6 pages.
Webpage—http://www.nada.kth.se/ hercules/nlg.html—"Automatic Writing: Text Generation and Summarization"—Last update—Jun. 20, 2001—2 pages.

* cited by examiner

*Primary Examiner*—V. Paul Harper
(74) *Attorney, Agent, or Firm*—Lloyd E. Dakin, Jr.

(57) ABSTRACT

The method of the present invention discloses: receiving a source text having a set of source text portions; generating a set of source text summarizations, each having a set of summarization portions, from the source text; calculating a portion score for each of the source text portions based on the source text portion's appearance in the summarizations; and populating a combined text summarization with those source text portions whose portion score exceeds a predetermined threshold. The system of the present invention discloses all means for implementing the method.

19 Claims, 9 Drawing Sheets

```
void FindMatch()

{
        int  i=1,j=1;
        while(1)
        {
                if(i>m||j>n)
                {
                        if(i>m) break;
                }
                else if(i<1)
                        break;
                if( W_j == Ai )
                {
                        Pi =j; // The j th word in the summary is the
                        i th word in the original text.
                        i++;
                        j++;
                }
                else
                        j++;
        }
}
```

| No | $a_{i1}$ | $a_{i2}$ | $a_{i3}$ | $S(W_i)$ |
|---|---|---|---|---|
| 1 | 0 | 0 | 0 | 0 |
| 2 | 0 | 0 | 1 | 0.8 |
| 3 | 0 | 1 | 0 | 1.2 |
| 4 | 0 | 1 | 1 | 2.5 |
| 5 | 1 | 0 | 0 | 1.1 |
| 6 | 1 | 0 | 1 | 2.2 |
| 7 | 1 | 1 | 0 | 2 |
| 8 | 1 | 1 | 1 | 3 |

Fig. 4

```
void Combine()
{
        int i,q=0;
        for(i=1;i<=n;i++)
        {
                if( S(W_i) >= TH )
                {
                        q++;
                        C_q = W_i ; // The q th word in the combined
                        summary is W_i
                }
        }
}
```

Fig. 5

SYSTEM AND METHOD FOR COMBINING TEXT SUMMARIZATIONS

BACKGROUND OF THE INVENTION

1. Field of the Invention

The present invention relates generally to systems and methods for summarizing text, and more particularly toward combining text summarizations.

2. Discussion of Background Art

The accessibility to and the need to understand information have significantly grown in the past several decades. Managing such huge quantities of information often then, becomes more of a burden than a resource. In response, the field of automated Text Summarization (TS) has developed. Text summarization defines a variety of techniques for reducing a set of source text into a relatively shorter set of summarized text.

Techniques used within the summarization field include Text Extraction (TE) and Text Abstraction (TA). Text extraction generally involves selecting a subset of "important" sentences, such as headlines leading sentences in a paragraph, proper nouns or phrases, citations, boldface or italic type, and etc. within a source text, which are then combined into what becomes a summarized text. Text Abstraction has a similar goal, however techniques for "interpreting/conceptualizing" the text are used.

Text summarization techniques are applicable to white papers, periodicals, legal documents, Internet searches, as well as many other information processing domains.

Due to the importance of text summarization, many companies have introduced summarization products that work to varying degrees. In fact, some summarizers tend to work better on some types of source text, but not others. Improvements in the field tend to be incremental and isolated, resulting in a patchwork of summarization strengths.

Some attempts have been made to combine multiple summarization techniques into a single product; however, these combinations tend to require generation of a completely new set of code that integrates the different techniques in a very detailed and involved way. Such code would need to be supplemented and perhaps even completely rewritten each time a new summarization technique was created.

Currently, however, there are no text summarization products that are able to quickly leverage the unique strengths currently found in existing text summarization systems, as well those yet to be developed.

In response to the concerns discussed above, what is needed is a system and method for text summarization that overcomes the problems of the prior art.

SUMMARY OF THE INVENTION

The present invention is a system and method for combining text summarizations. The method of the present invention includes the elements of: receiving a source text having a set of source text portions; generating a set of source text summarizations, each having a set of summarization portions, from the source text; calculating a portion score for each of the source text portions based on the source text portion's appearance in the summarizations; and populating a combined text summarization with those source text portions whose portion score exceeds a predetermined threshold. The system of the present invention includes all means for implementing the method.

These and other aspects of the invention will be recognized by those skilled in the art upon review of the detailed description, drawings, and claims set forth below.

BRIEF DESCRIPTION OF THE DRAWINGS

FIG. 3 is one source code embodiment for aligning text within the method;

FIG. 4 shows one embodiment of a look-up table for word score calculation;

FIG. 5 is one source code embodiment for populating a combined summarization within the method;

Appendix A is an exemplary set of source text;

Appendix B is a "Copernic" text summarization of the source text;

Appendix C is a "Text Analyst" text summarization of the source text;

Appendix D is a "Zentext" text summarization of the source text; and

Appendix E is one possible combination of the text summarizations.

DETAILED DESCRIPTION OF THE PREFERRED EMBODIMENT

The present invention is a system and method that leverages the unique text summarization strengths of many current, and future, text summarization systems. The invention uses existing summarizers to process a set of source text, and then itself processes the source text as well as the summarizations produced by the existing summarizers. This technique is a generic combination algorithm, which can receive as input summarizations from many different summarization systems. As a result, the present invention produces a summarization that is more relevant than any individual summarizer.

Figure 1:
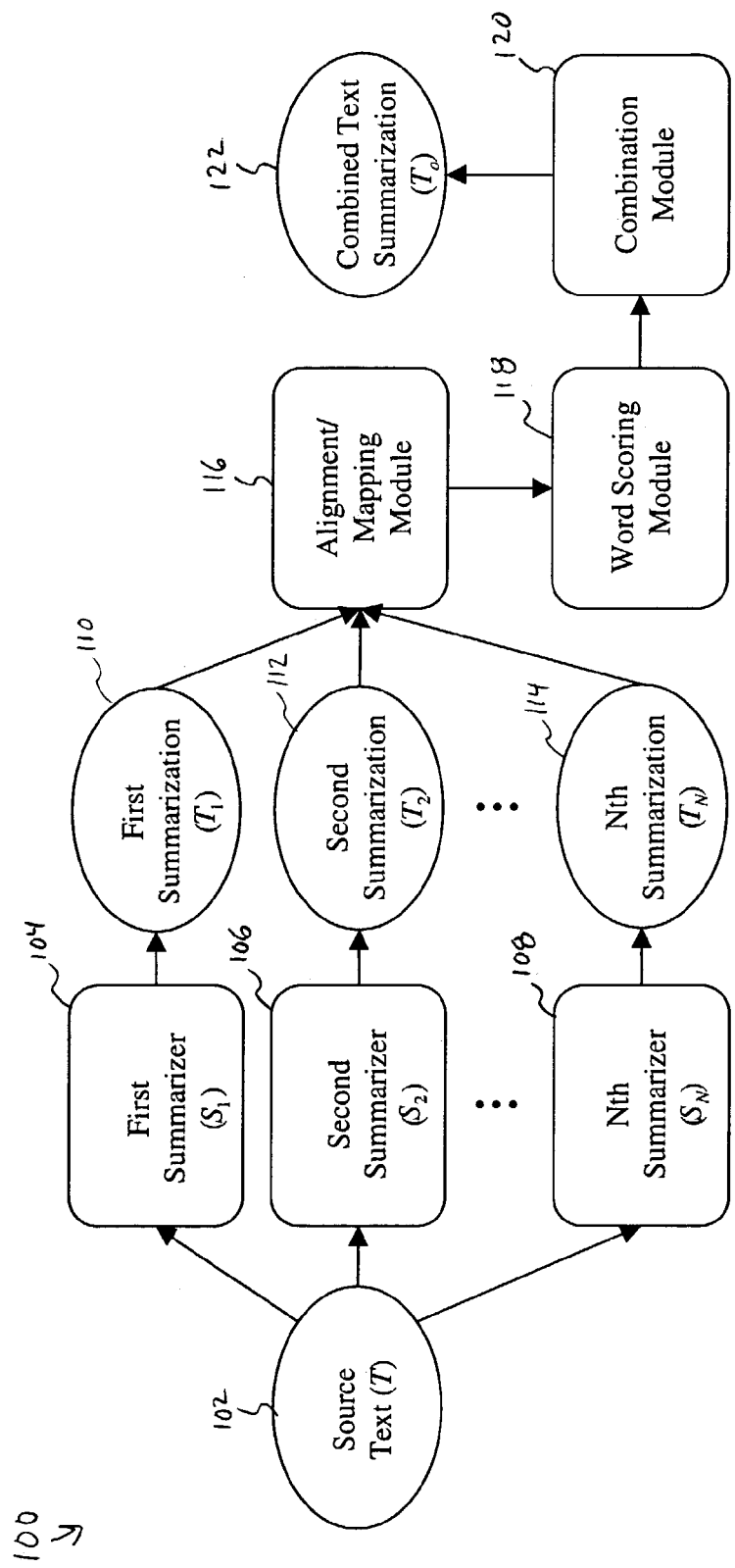
FIG. 1 is a dataflow diagram of one embodiment of a system for combining text summarizations.
Figure 2:
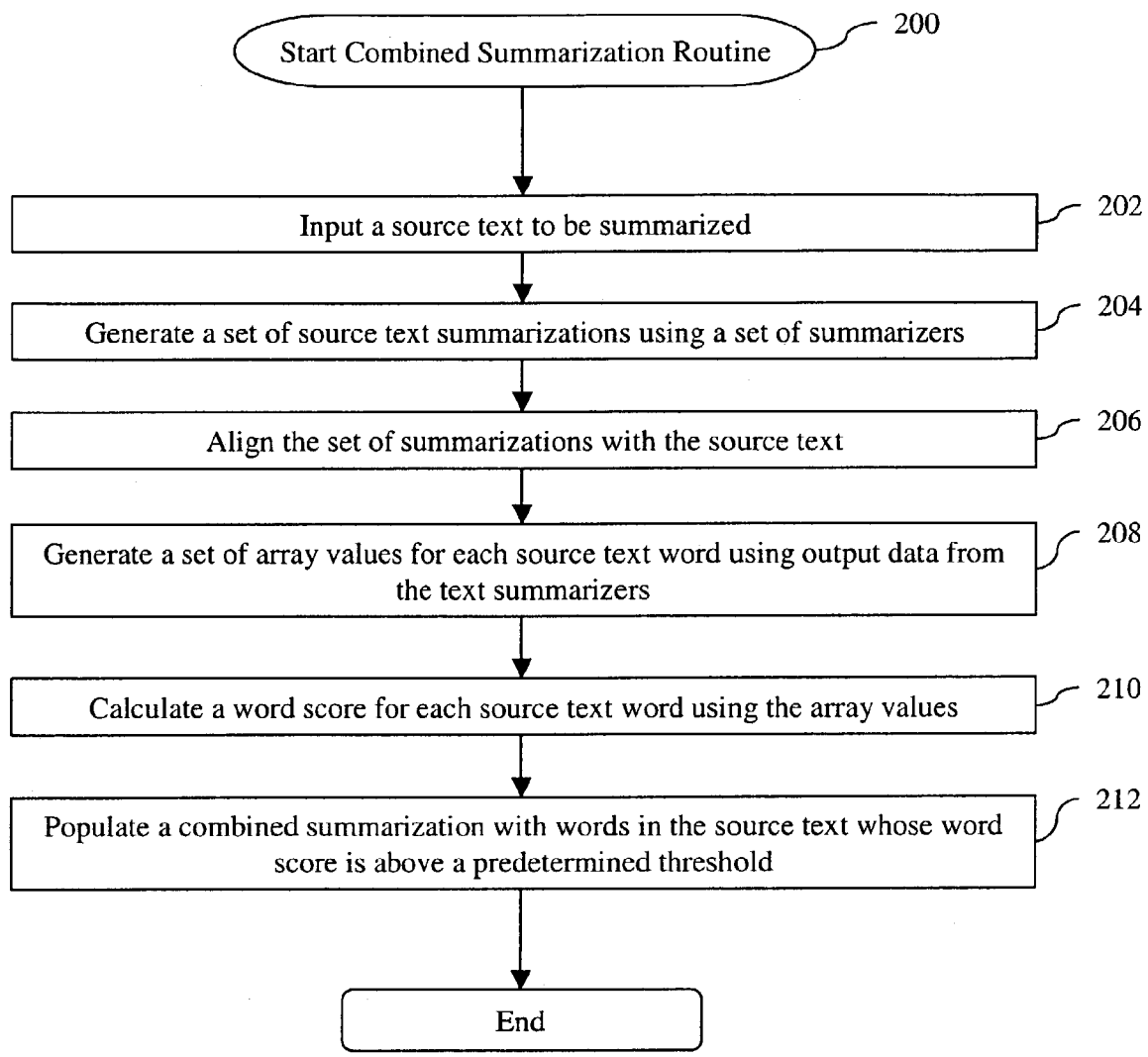
FIG. 2 is a flowchart of one embodiment of a method for combining text summarizations.

FIG. 1 is a dataflow diagram of one embodiment of a system 100 for combining text summarizations. FIG. 2 is a flowchart of one embodiment of a method 200 for combining text summarizations. FIGS. 1 and 2 are now discussed together using both functional and logical descriptions.

The method 200 begins in step 202, where a source text 102 to be summarized is received as input by a predetermined set of N summarizers ($S_i$, where "i" ranges from 1 to N), 104 through 108. The source text (T) includes a variety of source text portions, such as: letters, words, phrases, sentences, paragraphs, sections, chapters, titles, citations, footnotes, hyperlinks, as well as many other text portions known to those skilled in the art. For the purposes of the present discussion, the term text portion is herein defined to include any of the information contained in the source text, be it as small as a single letter, or as large as the entire source text.

To simplify the present discussion, source text words are used as exemplary source text portions, even though the present invention is applicable to all text portions. The source text 102 includes a set of "n" source words ($W_1$, $W_2 \ldots W_n$), with $W_i$ being a word. Thus, $T=\{W_1, W_2 \ldots W_n\}$. Each word is separated from other words by blanks, line breaks and/or paragraph breaks. An exemplary set of source text is shown in Appendix A. The exemplary set of source text is 1145 words long.

In step 204, the summarizers ($S_i$) 104 through 108, generate a corresponding set of source text summarizations ($T_i$, where "i" ranges from 1 to N), 110 through 114. The summary ($T_i$) includes a set of "m" summarization words $\{A_1, A_2 \ldots A_m\}$, where "m" tends to differ from summarizer to summarizer.

Text Extraction (TE) is one summarization technique that can be used. In TE, source text portions deemed to be the "most significant" within the source text are literally picked out and added to the summary without further processing. Most of the differences between different summarizers are directly related to how each individual summarizer determines which portions of the source text are "most significant."

The summaries are condensed versions of the source text, which usually is only 10-25% of the source text's original length. For example, Appendix B shows a "Copernic" summarization of the source text, which is 328 words long; Appendix C shows a "Text Analyst" summarization of the source text, which is 251 words long; and Appendix D shows a "Zentext" summarization of the source text, which is 319 words long. Copernic, Text Analyst, and Zentext are three popular commercial summarization software packages.

In the present invention, each summarizer preferably processes the source text 102 in parallel, speeding source text processing and the present invention's operating efficiency.

While some summarizers provide information on how their summary corresponds to the source text (for example, the $5^{th}$ word in the summary is the $10^{th}$ word in the original text), most summarizers just generate a summary without direct reference to the original source text.

As a result, in step 206, an alignment/mapping module 116 aligns the set of summarizations with (i.e. mapped to) the source text. Thus, summary text $T_i=\{A_1, A_2 \ldots A_m\}$, when mapped to (i.e. aligned with) the source text (T), yields $\{W_{P_1}, W_{P_2} \ldots W_{P_m}\}$, in which $W_{Pi}=A_i$ and $P_1<P_2 \ldots <P_m$. The variable "$P_i$" identifies which word $A_i$ is in the source text (T). FIG. 3 is one source code embodiment for aligning text within the method, written in a "C" language style.

Next in step 208, the alignment/mapping module 116 also generates an array indicating which words each of the text summarizers have included in their summaries. Thus, each word ($W_i$) in the source text (T) has an associated word inclusion array $\{a_{i1}, a_{i2} \ldots a_{iN}\}$, indicating which of the N summarizers included which word ($W_i$) in their summary.

In one embodiment, "$a_{ij}$" has a integer value of either "0" or "1", with "0" indicating that the summary does not include the word, and "1" indicating that the summary does include the word. For example, referring to Appendices B thorough D, each of the three summarizers choose the word "metaphor" from the source text, thus the array associated with the word "metaphor" is {1,1,1}, whereas the word "spectacle" appears only in Appendix summaries B and D, and the array associated with the word "spectacle" is {1,0,1}.

In a second embodiment, "$a_{ij}$" can have a fractional value somewhere between "0.000" and "1.000". This fractional value depends not only on whether the summary includes the word, as described above, but also on how each of the summarizers rates the importance of that word within the source text. For example, one summarizer might rank pronouns as higher in importance than other words in the source text, whereas another summarizer might rank words within a first sentence of every paragraph within the source text as of greater importance.

Next in step 210, a word scoring module 118 calculates a word score $S(W_i)$ for each word $W_i$ in the source text (T), as a function of each word's appearance in the summarizations. There are many alternate functions for calculating the word score $S(W_i)$. For instance, source text words can be scored using a summation function, such as:

$$S(W_i) = \sum_{j=1}^{N} a_{ij},$$

where array values $\{a_{i1}, a_{i2} \ldots a_{iN}\}$ are summed from each of the N summarizers. The score can be normalized by dividing it by N.

In step 212, a combination module 120 populates a combined text summarization ($T_o$) 122 with combined summarization words. The combined summarization words are those source words $W_i$ in the source text 102 whose word score $S(W_i)$ is above a predetermined threshold. For example, Appendix E is one possible combined summarization, using an equal weighting function and a threshold (TH) of 2, yielding a 227-word combined summarization. FIG. 5 is one source code embodiment for populating a combined summarization within the method. The source code is written in a "C" language style.

Figure 6:
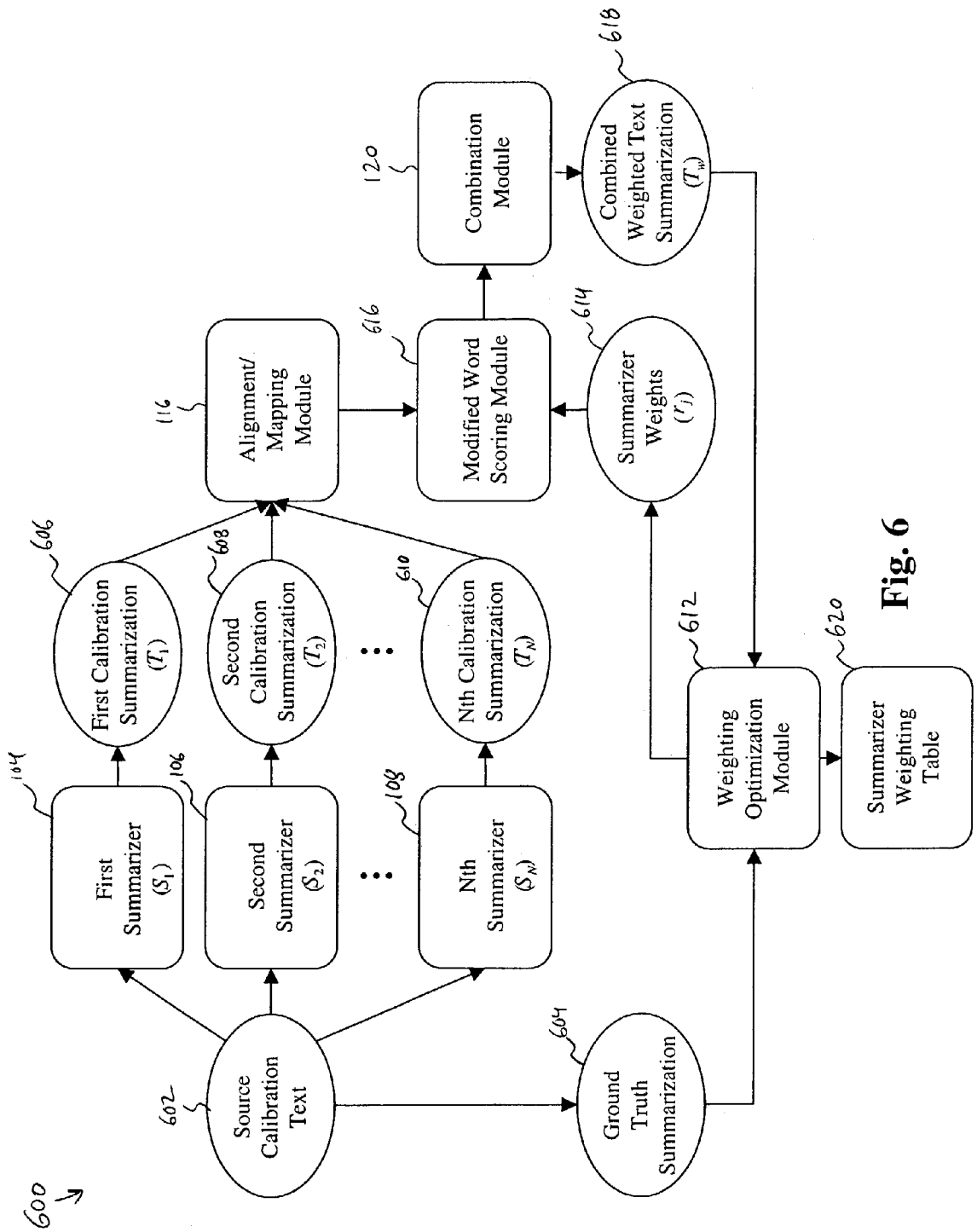
FIG. 6 is a dataflow diagram of one embodiment of a system for calibrating summarizers based on source text domain.
Figure 7:
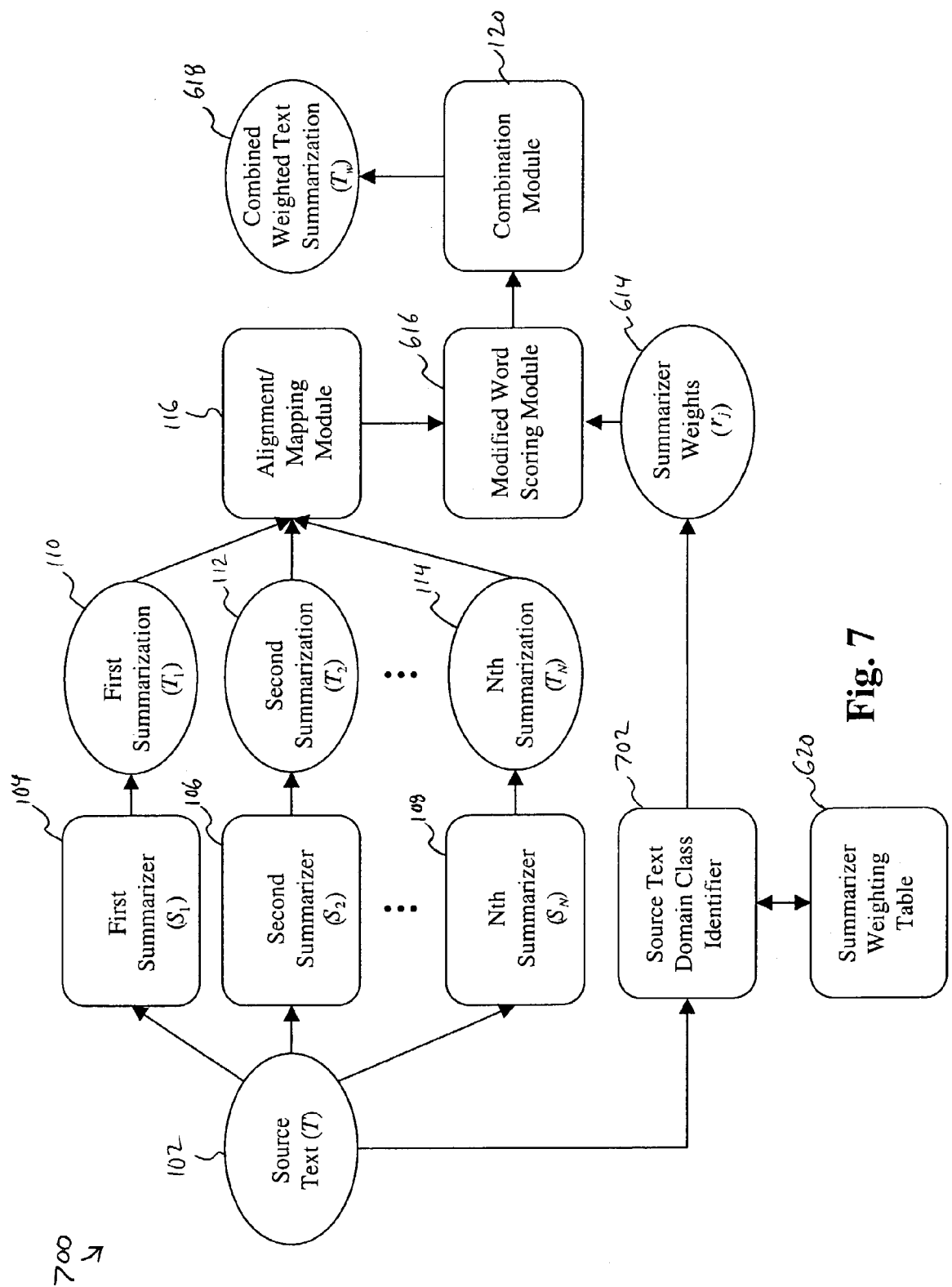
FIG. 7 is a dataflow diagram of one embodiment of a system for weighting summarizations based on source text domain.
Figure 8A:
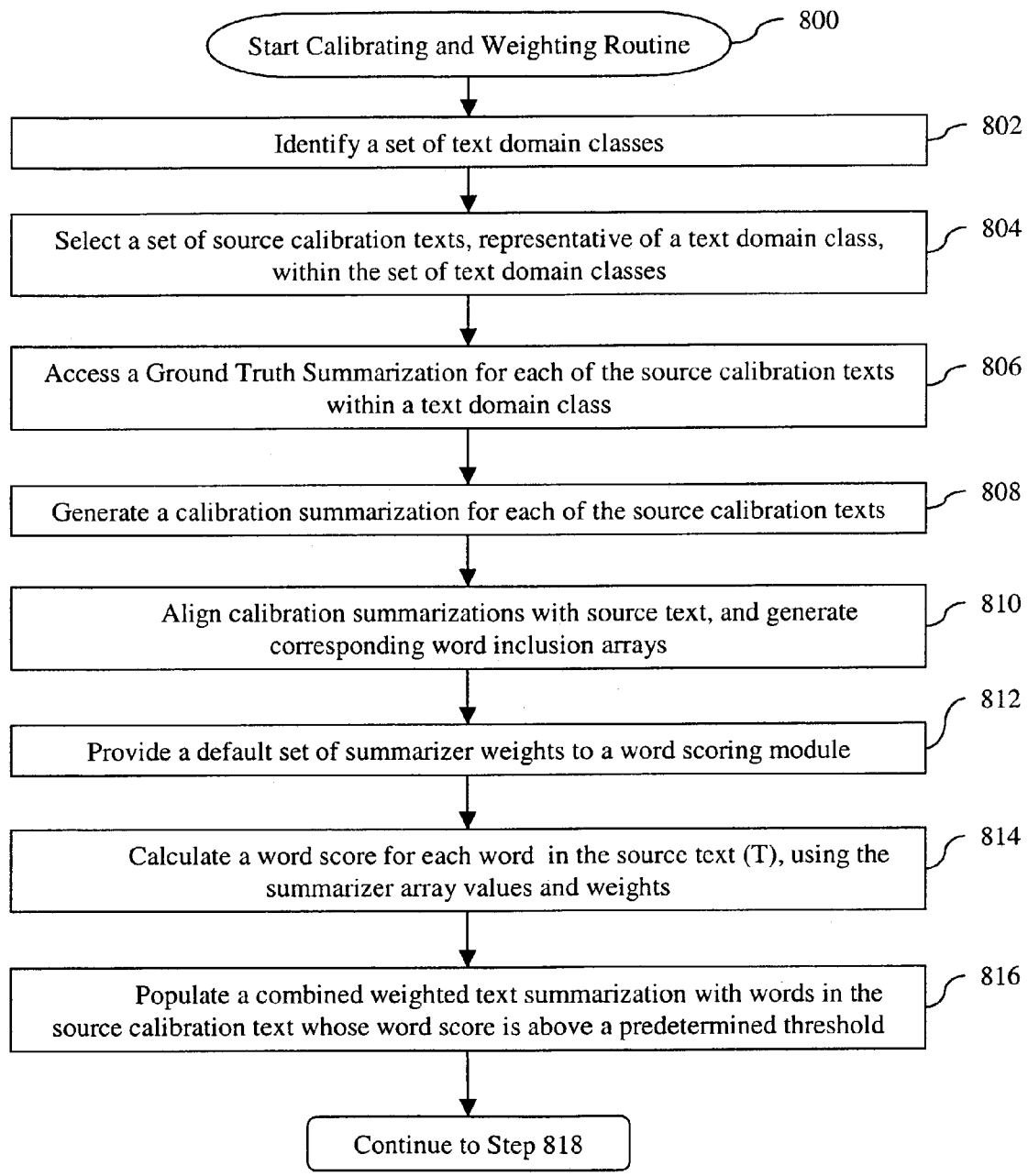
FIGS. 8A-8B are flowcharts of one embodiment of a method for calibrating summarizers and weighting summarizations based on source text domain.
Figure 8B:
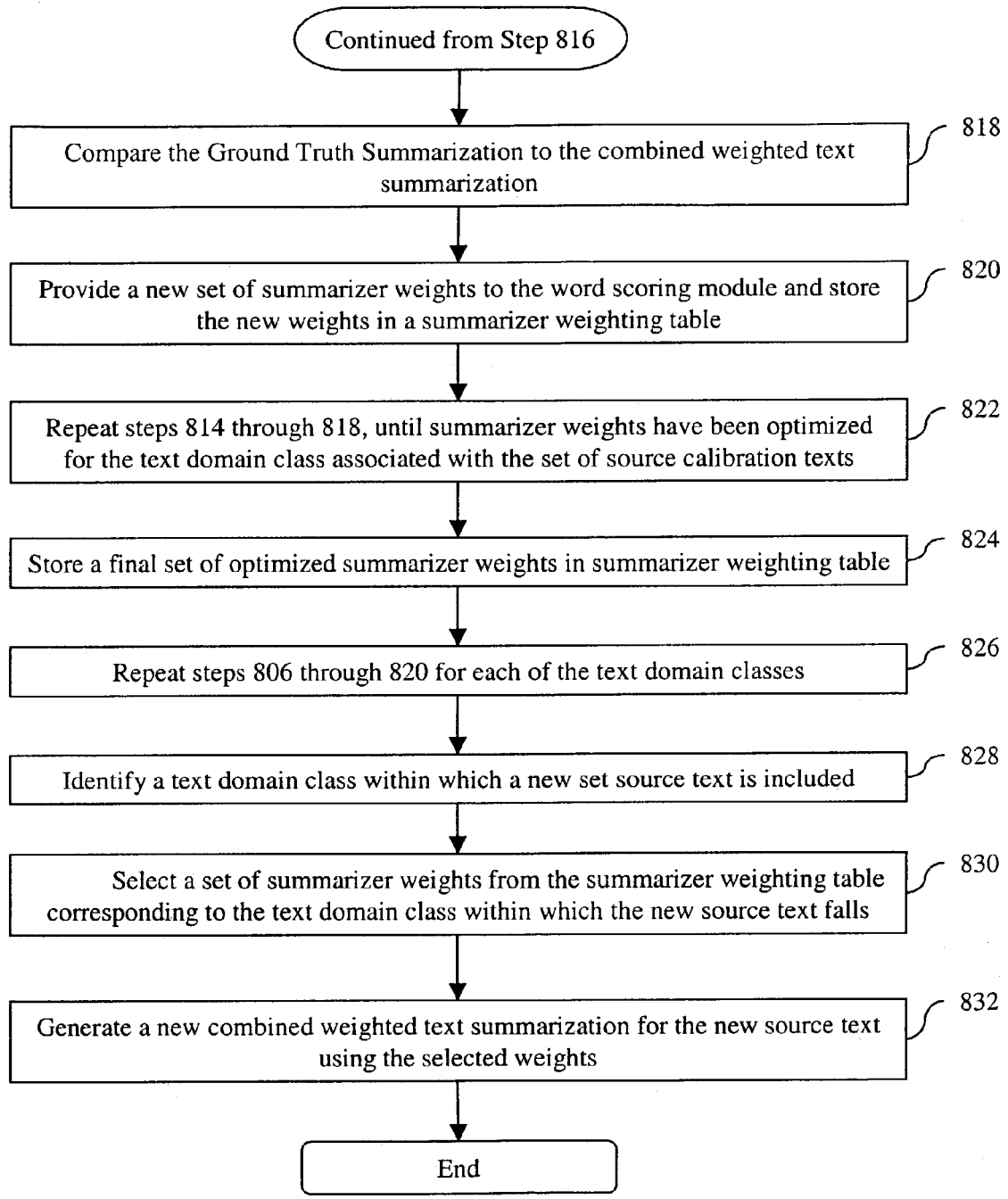

FIG. 6 is a dataflow diagram of one embodiment of a system 600 for calibrating summarizers based on source text domain. FIG. 7 is a dataflow diagram of one embodiment of a system 700 for weighting summarizations based on the source text domain. And, FIGS. 8A-8B are flowcharts of one embodiment of a method for calibrating summarizers and weighting summarizations based on the source text domain. FIGS. 6, 7 and 8A-8B are now discussed together.

Source texts summarized by the present invention, are expected to cover a wide range of subjects. These subjects can be broadly grouped into corpora, which are herein described as a set of text domains. Due to the varied authorship techniques common to each text domain, off-the-shelf summarizers tend to be optimized for just a few particular text domains. For instance, since newspaper articles tend to follow a common construction format, newspaper article summarizers are optimized to capture "titles," "leading paragraphs," and perhaps "final paragraphs." In contrast, summarizers optimized for scholarly papers may search for and focus on "abstract" and "conclusion" sections. As a result, a summarizer that generates relevant summaries for a first text domain may fail to do so for other text domains.

In the embodiment of the present invention, discussed with respect to FIGS. 1 and 2 above, an implicit assumption was that each of the summarizers performed almost equally well on all source texts. As a result, the combined text summarization 122 was effectively populated by majority voting.

However, in an improvement to the invention discussed above, a system and method for calibrating and weighting the summarizers 104 through 108 is now disclosed. Calibration tailors operation of the present invention to allow for variations in summarizer performance over differing text domains.

In step 802, a set of text domain classes are identified within which the present invention is expected to operate. Next in step 804, a set of source calibration texts, representative of a text domain class, within the set of text domain classes, are selected.

In step 806, a Ground Truth Summarization (GTS) 604 is accessed for each of the source calibration texts 602 within a text domain class. GTS's are typically created by an expert in the corresponding text domain class.

Then in step 808, each of the summarizers 104 through 108 generates a calibration summarization 606 through 610 for each of the source calibration texts 602. In step 810 an alignment/mapping module 116 aligns the set of calibration summarizations 606 through 610 with the source text, and generates corresponding word inclusion arrays.

Next in step 812, a weighting optimization module 612 provides a default set of summarizer weights ($r_j$) 614, preferably all equal in value, to a modified word scoring module 616. In step 814, the modified word scoring module 616 calculates a modified word score $S(W_i)$ for each word $W_i$ in the source text (T), using the summarizer array values and weights ($r_j$) 614.

As discussed with respect to FIGS. 1 and 2 above, there are many alternate functions for calculating the word score $S(W_i)$. In a first embodiment, source text words can be scored using a modified summation function, such as, $$S(W_i) = \sum_{j=1}^{N} r_j a_{ij},$$

where j identifies a summarizer from which an array value $a_{ij}$ is obtained, and that summarizer's corresponding weighting value $r_j$.

In a second embodiment, source text words are scored using a weighted exponential function, such as, $$S(W_i) = \prod_{j=1}^{N} a_{ij}^{r_j},$$

in which the summarizer weights are in the form of exponentials. This embodiment is preferred when the summarization techniques used in summarizers 104 through 108 are relatively independent.

In a third embodiment, source text words can be scored using a neural network, such as a Multiple Layer Perception (MLP) network, with $\{a_{i1}, a_{i2}, \ldots, a_{iN}\}$ as the input. Or in a fourth embodiment, $S(W_i)$ can be obtained using a look-up table where each array value of $\{a_{i1}, a_{i2}, \ldots, a_{iN}\}$ is either 0 or 1. In this case, the total number of combinations of $\{a_{i1}, a_{i2}, \ldots, a_{iN}\}$ is limited to $2^N$. The table can be filled experimentally or through any systematic approach, such as described later. An advantage of the look-up table includes increased speed, since actual word score calculation is done off-line; and, increased flexibility, since arbitrary functions can be realized with look-up tables without reprogramming the system 100. For example, FIG. 4 shows one embodiment of a look-up table 400 for word score calculation. In this embodiment, it is presumed to have only three summarizers (i.e. N=3).

In step 816, the combination module 120 populates a combined weighted text summarization ($T_w$) 618 with words $W_i$ in the source calibration text 602 whose word score $S(W_i)$ is above a predetermined threshold.

In step 818, the weighting optimization module 612 compares the Ground Truth Summarization 604 to the combined weighted text summarization ($T_w$) 618. In step 820 the optimization module 612 provides a new set of summarizer weights ($r_j$) 614 to the modified word scoring module 616 and stores the new weights in a summarizer weighting table 620.

In step 822, the method 800 repeats steps 814 through 818, until the weighting optimization module 612 decides that the summarizer weights ($r_j$) 614 have been optimized for the text domain class associated with the set of source calibration texts.

Optimization preferably occurs when the set of summarizer weights ($r_j$) yields a "best-fit" between the Ground Truth Summarization 604 and the combined weighted text summarization ($T_w$) 618. To this end, a variety of cost/target functions may be used, such as the Mean Square Error (MSE):

$$\text{Cost} = \sum_{i=1}^{q} (S(W_i) - g_i)^2$$

$$\text{where } g_i = \begin{cases} 1 & (W_i \text{ is in the ground truth summary}) \\ 0 & (W_i \text{ is not in the ground truth summary}) \end{cases},$$

and q is the number of words in the source text. Numerical analysis software, such as MatLab, can be used to implement the optimization.

Next in step 824, the weighting optimization module 612 stores a final set of optimized summarizer weights ($r_j$) in the summarizer weighting table 620.

In step 826, steps 806 through 820 are repeated for each of the text domain classes.

Next in step 828, a source text domain class identifier module 702, identifies a text domain class within which a new set of source text, such as the source text 102, is included. Identification can be performed by requesting that a user identify the text domain class by selecting from a set of text domains presented to him/her. Alternatively, identification may be automatically performed by analyzing keywords within the source text 102 in order to determine the text domain class into which the source text 102 falls.

In step 830, the identifier module 702 selects a set of summarizer weights ($r_j$) 614 from the summarizer weighting table 620 corresponding to the text domain class within which the new source text falls, and provides the selected weights to the modified word scoring module 616. Then in step 832, a new combined weighted text summarization ($T_w$) 618 is generated for the new source text, as described in step 814 and 816, using the selected weights, after which the method 800 ends.

While one or more embodiments of the present invention have been described, those skilled in the art will recognize that various modifications may be made. Variations upon and modifications to these embodiments are provided by the present invention, which is limited only by the following claims.

What is claimed is:

1. A method for combining text summarizations, comprising:

receiving a source text having a set of source text portions;

generating plural source text summarizations from the source text, wherein the plural source text summarizations include corresponding sets of summarization portions;

calculating a portion score for each of the source text portions based on the source text portion's appearance in the summarizations;

populating a combined text summarization with those source text portions whose portion score exceeds a predetermined threshold; and producing the combined text summarization as a summarization of the source text.

2. The method of claim 1,
wherein calculating the portion score for each of the source text portions comprises calculating the portion score for words.

3. The method of claim 1,
wherein generating the plural source text summarizations includes generating the plural source text summarizations with different text summarizers operating in parallel.

4. The method of claim 1,
wherein generating the plural source text summarizations includes using text extraction techniques.

5. The method of claim 1,
wherein calculating the portion score for each of the source text portions includes aligning the summarization portions with the source text portions.

6. The method of claim 5:
wherein aligning the summarization portions with the source text portions includes generating an inclusion array, indicating which of the text summarizations have summarization portions equivalent to the source text portions.

7. The method of claim 1,
wherein calculating the portion score includes using a summation function.

8. The method of claim 1,
wherein calculating the portion score includes using a neural network.

9. The method of claim 1,
wherein calculating the portion score includes using a look-up table.

10. The method of claim 1,
wherein calculating the portion score includes using a weighted exponential function.

11. The method of claim 1:
further comprising, identifying a text domain class applicable to the source text; and
wherein calculating the portion score for each of the source text portions includes weighting how the source text summarizations contribute to the portion score based on the identified text domain class.

12. The method of claim 11, wherein calculating the portion score for each of the source text portions includes,
optimizing a set of summarization weights for the source text summarizations based on the identified text domain class; and
weighting the source text summarizations with the summarization weights.

13. The method of claim 12, wherein optimizing the set of summarization weights includes:

selecting a calibration text, representative of the text domain class, having a set of calibration text portions;

generating a set of calibration text summarizations from the calibration text, wherein each calibration text summarization has a set of calibration summarization portions;

retrieving the set of summarization weights associated with the identified text domain class;

calculating a calibration portion score for each of the calibration text portions based on the source text portion's appearance in the calibration text summarizations and the summarization weights;

populating a combined calibration text summarization with those calibration text portions whose calibration portion score exceeds a predetermined calibration threshold;

accessing a ground truth summarization for the calibration text;

comparing the combined calibration text summarization to the ground truth summarization; and adjusting the set of summarization weights to yield a best-fit between the combined calibration text summarization and the ground truth summarization.

14. The method of claim 1, wherein plural different types of summarizers generate the respective source text summarizations, the method further comprising:

generating arrays for respective source text portions, wherein each array indicates which one or more of the source text summarizations includes the respective source text portion, and wherein calculating the portion score for each source text portion is based on the arrays.

15. The method of claim 1, further comprising:
performing a calibration process based on source calibration texts to produce weights,
wherein calculating the portion score for each of the source text portions is based on the weights.

16. A method for combining text summarizations, comprising:

receiving a source text having a set of source text portions;

generating a set of source text summarizations from the source text, wherein each source text summarization has a set of summarization portions;

calculating a portion score for each of the source text portions based on the source text portion's appearance in the summarizations;

populating a combined text summarization with those source text portions whose portion score exceeds a predetermined threshold;

producing the combined text summarization as a summarization of the source text;

identifying a text domain class applicable to the source text; and wherein calculating includes,
weighting how the source text summarizations contribute to the portion score based on the identified text domain class;
optimizing a set of summarization weights for the source text summarizations based on the identified text domain class; and
weighting the source text summarizations with the summarization weights; and wherein optimizing includes,
selecting a calibration text, representative of the text domain class, having a set of calibration text portions;
generating a set of calibration text summarizations from the calibration text, wherein each of the calibration text summarizations has a set of calibration summarization portions;
retrieving the set of summarization weights associated with the identified text domain class;
calculating a calibration portion score for each of the calibration text portions based on the source text portion's appearance in the calibration text summarizations and the summarization weights;
populating a combined calibration text summarization with those calibration text portions whose calibration portion score exceeds a predetermined calibration threshold;
accessing a ground truth summarization for the calibration text;
comparing the combined calibration text summarization to the ground truth summarization; and
adjusting the set of summarization weights to yield a best-fit between the combined calibration text summarization and the ground truth summarization.

17. A system for combining text summarizations, comprising:
means for receiving a source text having a set of source text portions;
means for generating plural source text summarizations from the source text, wherein each source text summarization has a set of summarization portions;
means for calculating a portion score for each of the source text portions based on the source text portion's appearance in the summarizations;
means for populating a combined text summarization with those source text portions whose portion score exceeds a predetermined threshold; and
means for producing the combined text summarization as a summarization of the source text.

18. The system of claim 17, further comprising:
means for identifying a text domain class applicable to the source text.

19. The system of claim 17, wherein the means for generating the plural source text summarizations comprises plural different types of summarizers for generating respective source text summarizations.

* * * * *